United States Patent
Berrier et al.

(10) Patent No.: US 10,358,077 B1
(45) Date of Patent: Jul. 23, 2019

(54) TAILGATE TOWING REPLACEMENT ACCESSORY

(71) Applicants: Todd Berrier, Clemmons, NC (US); Ginger Berrier, Clemmons, NC (US)

(72) Inventors: Todd Berrier, Clemmons, NC (US); Ginger Berrier, Clemmons, NC (US)

(*) Notice: Subject to any disclaimer, the term of this patent is extended or adjusted under 35 U.S.C. 154(b) by 38 days.

(21) Appl. No.: 15/709,924

(22) Filed: Sep. 20, 2017

Related U.S. Application Data (60) Provisional application No. 62/398,827, filed on Sep. 23, 2016.

(51) Int. Cl.
 *B62D 33/00* (2006.01)
 *B60P 3/06* (2006.01)
 *B62D 33/02* (2006.01)

(52) U.S. Cl.
 CPC ............ *B60P 3/06* (2013.01); *B62D 33/02* (2013.01); *B60Y 2200/86* (2013.01)

(58) Field of Classification Search
 CPC ........ B60P 3/06; B62D 33/02; B60Y 2200/86
 See application file for complete search history.

(56) References Cited

U.S. PATENT DOCUMENTS

| | | | |
|---|---|---|---|
| 3,025,985 A | 3/1962 | Crawford | 214/505 |
| 3,796,444 A | 3/1974 | Hixton | 280/483 |
| 3,893,713 A | 7/1975 | Ivy | 280/511 |
| 4,061,257 A | 12/1977 | St. Clair | 224/42.08 |
| 4,318,657 A * | 3/1982 | Znidaric | B60P 3/07 298/14 |
| 4,946,333 A * | 8/1990 | Boatwright | B60P 3/07 254/327 |
| 5,281,075 A | 1/1994 | Tatman et al. | 414/538 |
| 6,698,996 B2 | 3/2004 | Smith, Jr. | 414/471 |
| 6,942,252 B2 * | 9/2005 | Buuck | B62D 25/188 280/154 |
| 7,544,027 B2 * | 6/2009 | Barker | B60P 1/43 410/3 |
| 7,997,850 B2 | 8/2011 | Hutchison | 414/478 |
| 2009/0025154 A1 | 1/2009 | Smith | 14/71.7 |
| 2009/0200823 A1 * | 8/2009 | Vertanen | B60P 3/40 296/26.08 |
| 2011/0250042 A1 * | 10/2011 | Juarez-Ortega | B60P 3/1025 414/559 |
| 2015/0224907 A1 * | 8/2015 | Holmgren | B60P 3/08 414/482 |
| 2017/0174115 A1 * | 6/2017 | Frost | B60P 3/1025 |

* cited by examiner

*Primary Examiner* — Lori L Lyjak
(74) *Attorney, Agent, or Firm* — MacCord Mason PLLC (57) ABSTRACT

A truck having a towing accessory adapted to carry a second vehicle comprising a truck bed having a proximal end and a distal end and a towing accessory attached to the distal end of the truck bed, wherein the towing accessory is adapted to support a pair of wheels of a second vehicle by extending the length of the truck bed. The towing accessory includes a first frame member and a second frame member with lengths spanning a width of the truck bed and spaced substantially parallel to one another. The first frame member and the second frame member are connected by a support adapted to secure a pair of wheels of the second vehicle within the towing accessory.

19 Claims, 15 Drawing Sheets

PRIOR ART

TAILGATE TOWING REPLACEMENT ACCESSORY

FIELD OF THE TECHNOLOGY

The present invention relates generally to truck accessories and, more particularly, to a towing accessory adapted for carrying a second vehicle in a truck bed.

BACKGROUND

Trucks are a widely popular variety of transportation for both commercial and private use. Private owners of trucks often use their vehicles to tow all manners of recreational vehicles such as campers or trailers that carry other vehicles such as ATVs.

Figure 1:
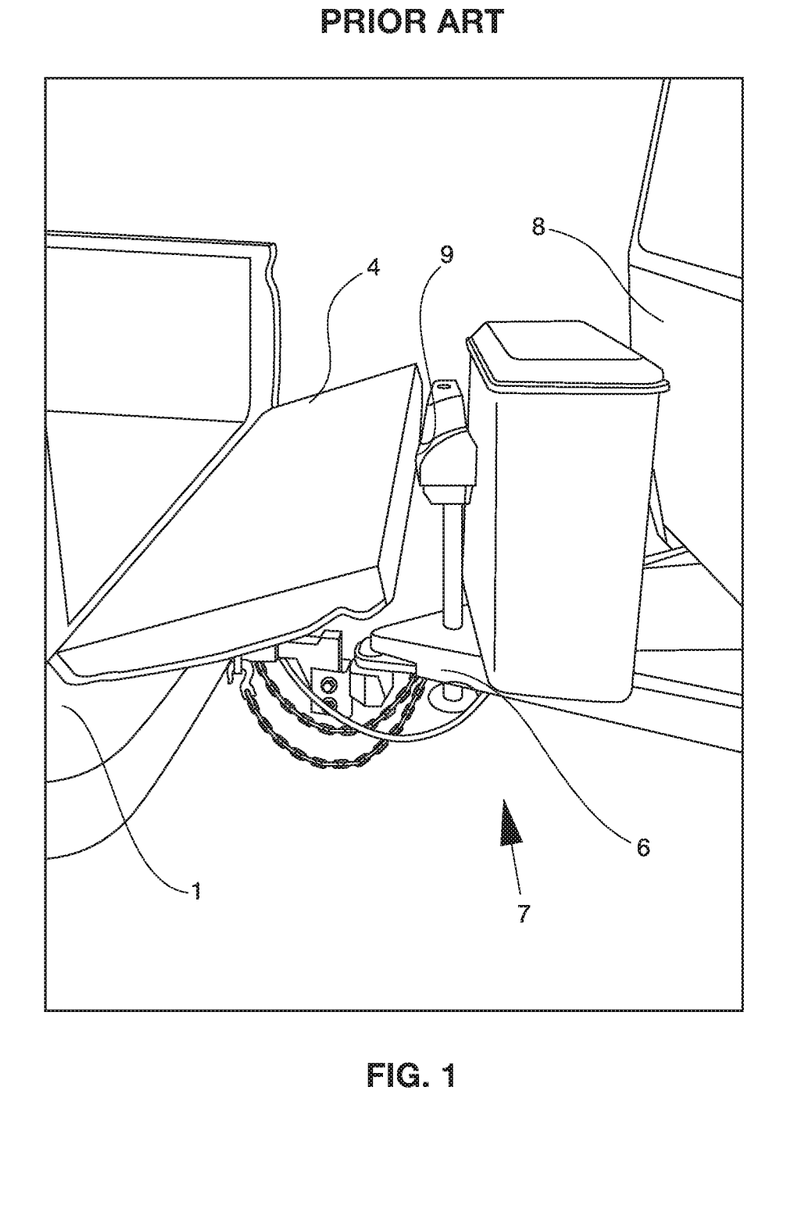
FIG. 1 is an enlarged side view of a truck with a recreational vehicle attached to its hitch and having the tailgate partially extended.

In the event an individual would like to carry a second vehicle such as a golf cart while also towing a camper, the truck can no longer safely execute both tasks as the tailgate would neither be fully closed nor fully extended (see FIG. 1 of the prior art). Lowering the tailgate of the trucks extends its overall length thereby interfering with the standard placement of gas tanks mounted on campers. However, removing the tailgate to accommodate the towed item would also be an unacceptable solution as the second vehicle will not be secured on the truck bed and may have its rear wheels hanging over the end of the truck bed.

Thus, Applicant desires a truck bed solution that eliminates obstruction of the tailgate by a towed vehicle, while at the same time, enabling the truck bed to securely carry a second vehicle.

SUMMARY

In accordance with the present disclosure, a truck is provided having a towing accessory adapted to carry a second vehicle. This disclosure provides a system and method for enabling a truck to carry a second vehicle, while also enabling the truck to simultaneously tow a recreational vehicle.

One embodiment of the present disclosure includes a truck having a towing accessory adapted to carry a second vehicle comprising a truck bed having a proximal end and a distal end, and a towing accessory attached to the distal end of the truck bed for supporting a pair of wheels of a second vehicle by extending the length of the truck bed. By way of example, the second vehicle may be a golf cart.

The towing accessory includes a first frame member and a second frame member with lengths spanning a width of the truck bed and spaced substantially parallel to one another and connected by a tubular support. For instance, the first frame member and second frame member align with substantially no overlap. In an example, the first frame member and second frame member are formed from tubing frames.

In one example, the truck bed forms a hinge with each end of the first frame member. For instance, the hinge may be formed between a slot in the first frame member and a tailgate post in the truck bed. The tailgate post may be secured by a rubber lining in the slot.

In another example, the towing accessory may have a stowed position adapted for storage and an extended position adapted for supporting the second vehicle. In the extended position, the second frame member is positioned distally away from the first frame member and the truck bed. In the stowed position, the second frame member is positioned above the first frame member.

Another embodiment of the present disclosure includes a tailgate towing replacement accessory for a truck adapted to carry a second vehicle in a truck bed comprising a first frame member with opposing ends adapted to form a tailgate hinge, a second frame member substantially parallel to the first frame member adapted to extend the length of the truck bed, a support attaching the first frame member to the second frame member, and a tailgate link attached to one end to the second frame member and having another end adapted for attaching to a truck. The first frame member may be produced in various fixed sizes to accommodate specific truck bed widths. Yet in other examples, the first frame member may be telescopic to accommodate varying widths of truck beds.

In some examples, the towing accessory may include a pair of supports adapted to retain the pair of wheels of the second vehicle within the towing accessory. Some examples may further include a second pair of supports to facilitate retention of the pair of wheels.

In certain examples, the tailgate link comprises a first tailgate link and a second tailgate link attached to opposing ends of the second frame member. For instance, the tailgate link may comprise a cable. In another instance, the tailgate link may comprise a beam. The beam may further include a hinge adapted to position the towing accessory between a stowed position for storage and an extended position for securing the second vehicle. The beam may also include a spring adapted to bias the towing accessory toward the stowed position.

The present disclosures may also be considered a method for carrying a golf cart on a truck. The method may include the steps of removing a tailgate from the truck, inserting opposing ends of a first frame member of a tailgate replacement into a pair of tailgate posts on the truck, supporting a second frame member of the tailgate replacement by connecting a pair of tailgate links installed the ends of the second frame member to a pair of striker assemblies located on the truck, inserting the golf cart onto the truck bed, placing a pair of wheels of the golf cart onto the first member and second frame member of the tailgate replacement, and aligning each pair of wheels onto a pair of supports connecting the first frame member with the second frame member. The method may also include the step of securing a recreational vehicle to a hitch of the truck.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 2:
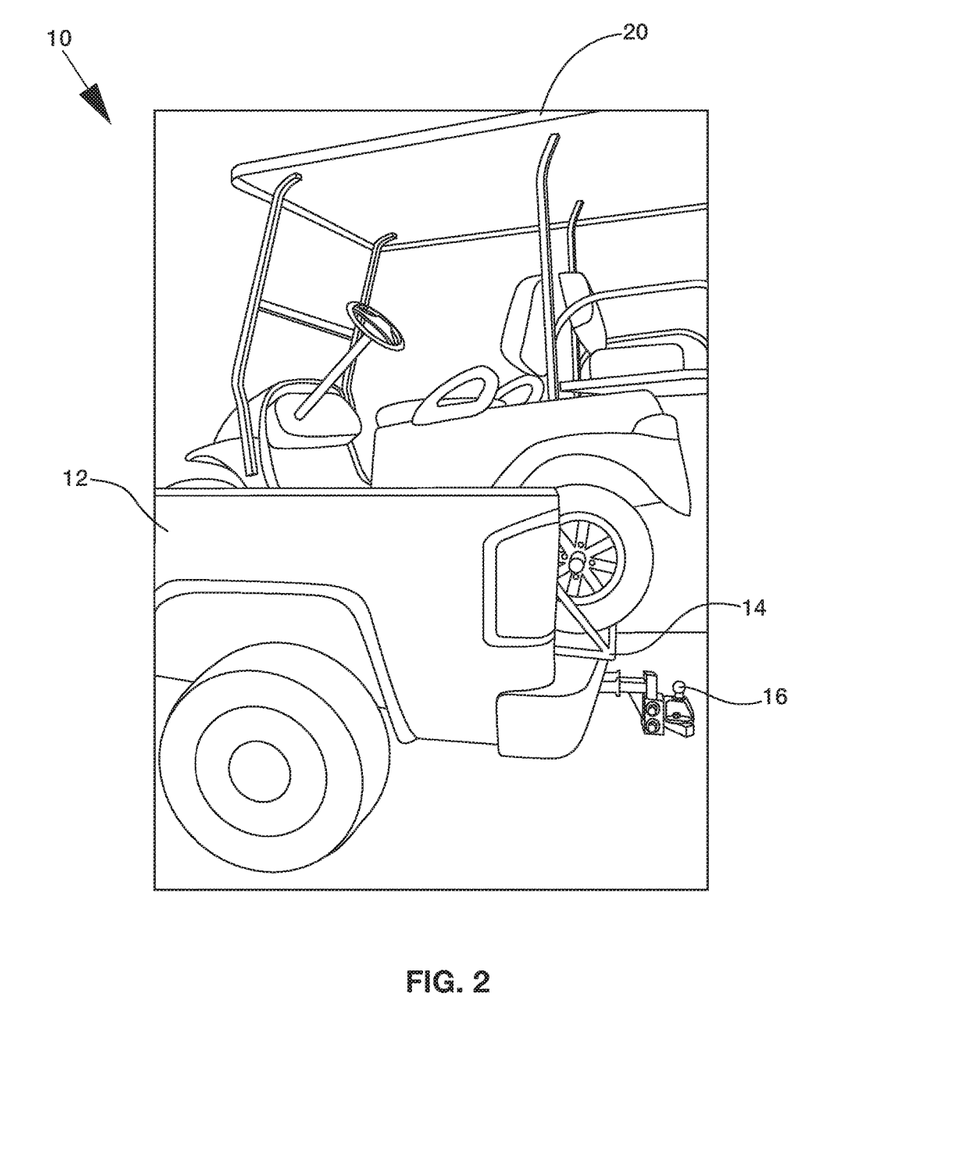
FIG. 2 is an enlarged side view of a truck carrying a second vehicle using a towing accessory constructed according to one example the present disclosure.

Referring now to the drawings in general and FIG. 2 in particular, it will be understood that the illustrations are for the purpose of describing a preferred embodiment of the invention and are not intended to limit the invention thereto. As best seen in FIG. 2, a truck, generally designated 10, is shown constructed according to the present invention. The truck 10 includes a truck bed 12 with a towing accessory 14 at its distal end. Towing accessory 14 is adapted to extend the length of truck bed 12 and enable second vehicle 20 to be securely hauled by truck 10. By using truck bed 12 to transport second vehicle 20, the hitch 16 remains available to tow other items.

Figure 3A:
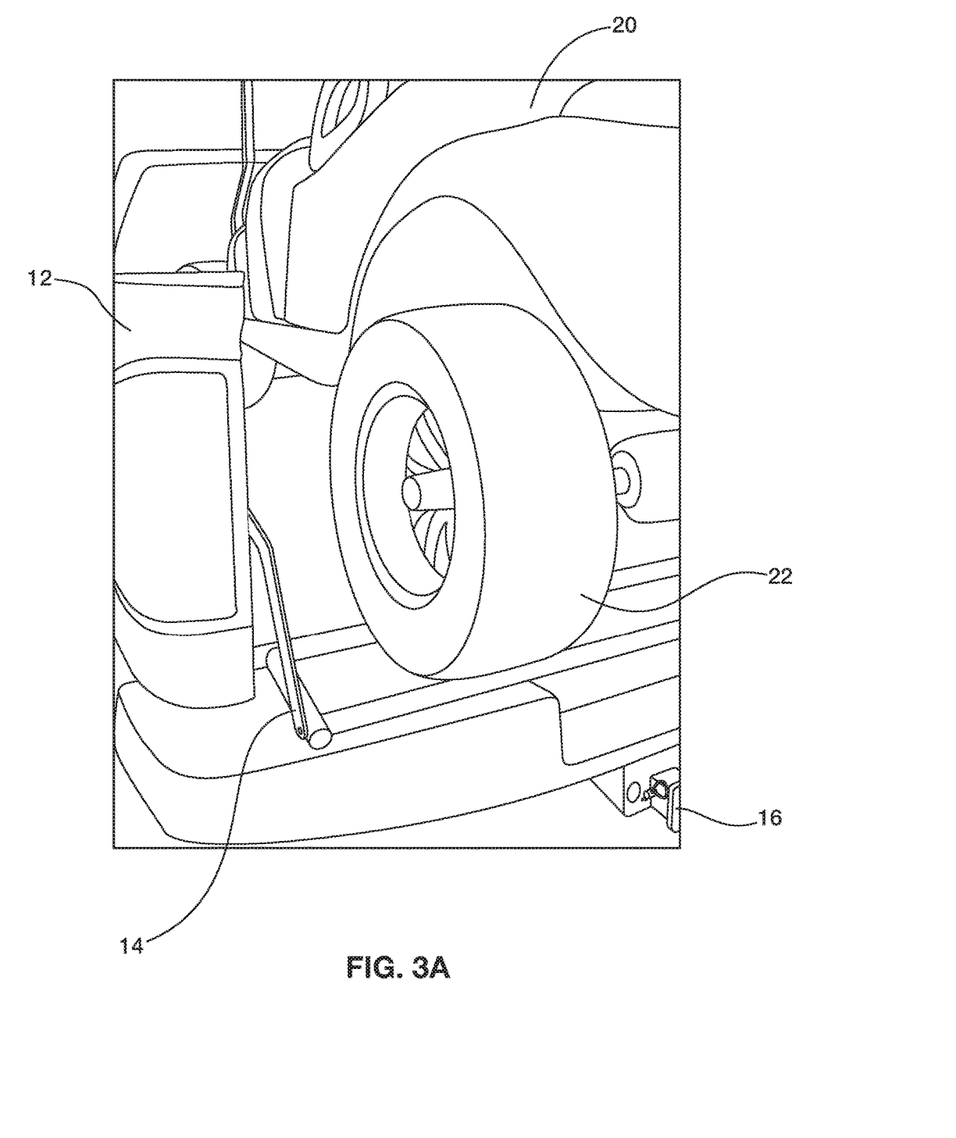
FIG. 3A is an enlarged perspective view of the truck and towing accessory shown in FIG. 2.
Figure 3B:
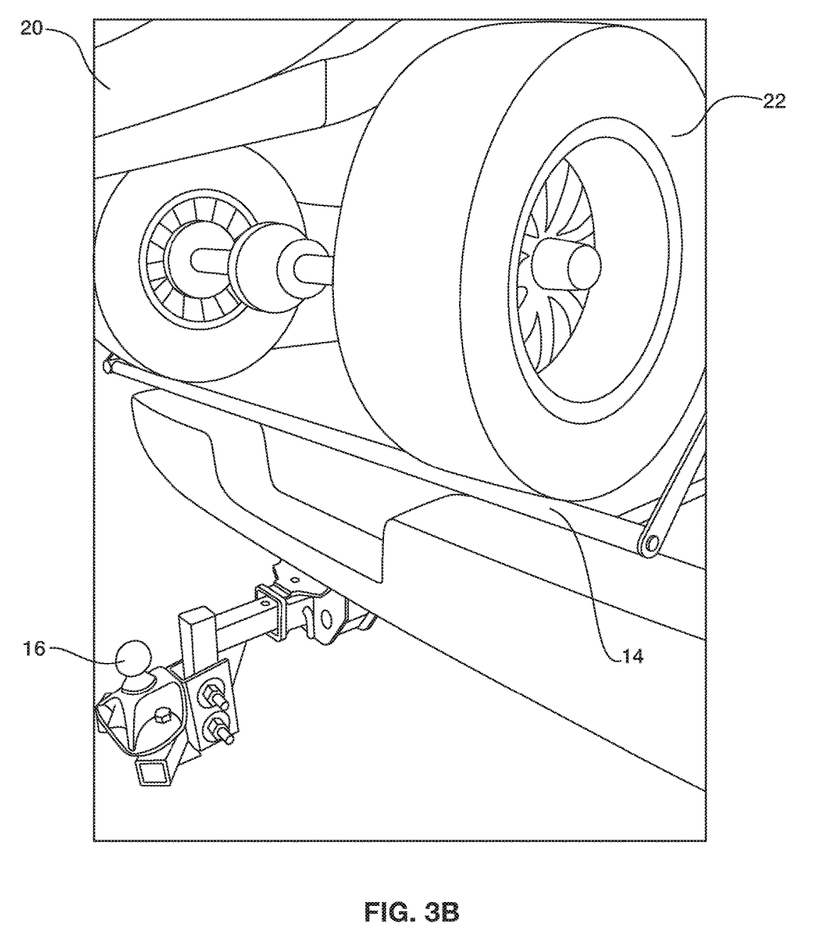
FIG. 3B is another enlarged perspective view of the truck and towing accessory shown in FIG. 2.

Turning now to FIGS. 3A and 3B, towing accessory 14 receives a pair of wheels 12 from second vehicle 20. In the example shown, second vehicle 20 is a golf cart and the pair of wheels 22 are located on the rear of second vehicle 20. Other examples of vehicles compatible with towing accessory 14 may include a utility vehicle or a neighborhood electric vehicle. Moreover, the second vehicle 20 may be oriented such that the front pair of wheels are placed on towing accessory 14.

Figure 4:
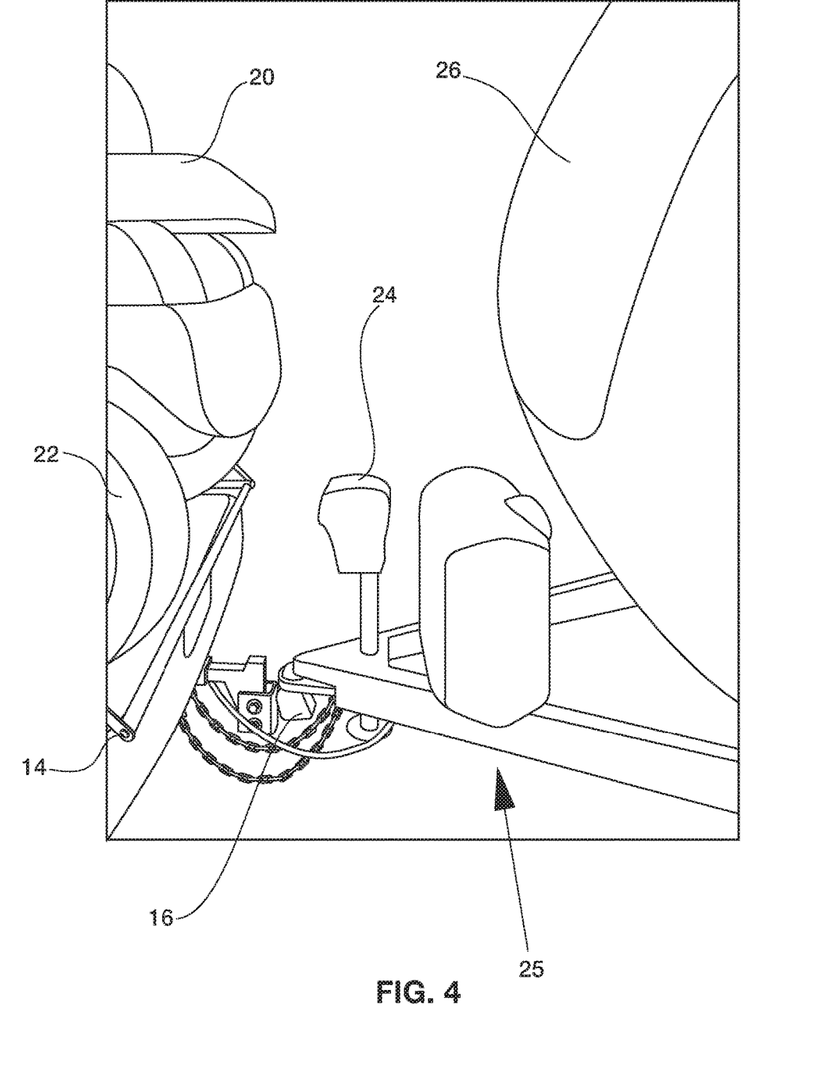
FIG. 4 is an enlarged side view of a truck with a recreational vehicle attached to its hitch and a second vehicle attached to a towing accessory constructed according to the present disclosure.

FIG. 4 shows truck 10 carrying a second vehicle 20 while simultaneously towing a recreational vehicle 26. Towing accessory 14 is extended out to accommodate loading of second vehicle 20 onto truck bed 12, while at the same time, maintaining a distance 24 away to prevent collision with towing assembly 25. In comparison, FIG. 1 (prior art) shows a truck 1 with a tailgate 4 and a towing assembly 7 attached to hitch 6. Tailgate 4 is unable to completely extend out since gas tank 9 is mounted by recreational vehicle 8, and thus a second vehicle cannot be safely carried in the truck bed. Moreover, tailgate 4 lacks a means to secure the second vehicle to a truck bed, since the tailgate's surface is only an extension of the truck bed. Returning to FIG. 4, the distance 24 between towing accessory 14 and towing assembly 25 enables users to safely transport second vehicle 20 within the truck bed 12 instead of relying on hitch 16.

Figure 5:
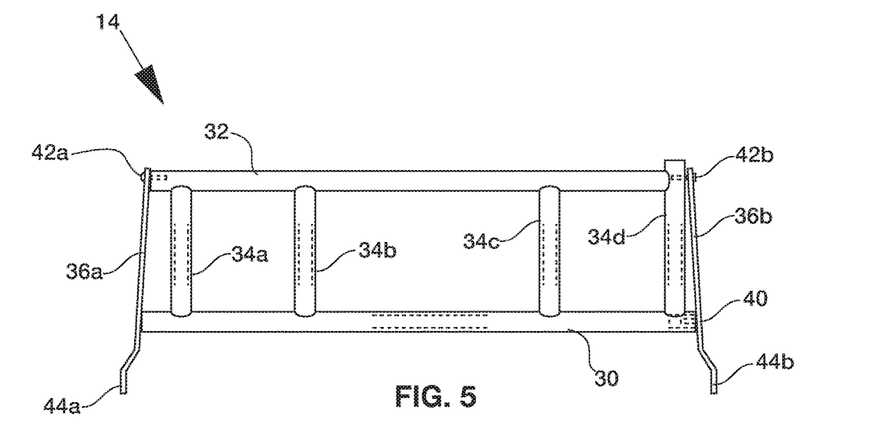
FIG. 5 is a front elevational view of a towing accessory constructed according to one example of the present disclosure.

FIG. 5 shows one example of a towing accessory 14. As seen in this example, towing accessory 14 comprises a first frame member 30 and a second frame member 32 connected by two pairs of supports 34. A first pair of supports 34a and 34b are adapted to secure a first wheel, while the second pair of supports 34c and 34d are adapted to secure a second wheel. Each wheel may be inserted between each pair of supports. For instance, the left wheel may be inserted in between supports 34a and 34b and the right wheel may be inserted in between supports 34c and 34d. In other examples of towing accessory 14, only a single pair of supports 34 may be provided. For instance, first frame member 30 may be connected to second frame member 32 via support 34b and 34c. The pair of wheels 22 of a second vehicle 20 may be either placed directly on or adjacent to each support 34. Placement of supports 34 may vary depending on the width of the truck bed 12 as well as the spacing between the wheels that towing accessory 14 may be designed to accommodate. For example, towing accessory 14 may include only a single pair of supports 34a and 34d. In other examples, additional supports may be included to provide more spacing options for placing a pair of wheels within the towing accessory to secure a second vehicle.

Returning to the example in FIG. 5, the first frame member 30 and second frame member 32 are oriented substantially parallel with one another. Moreover, each support 34 is parallel with one another, but remain perpendicular with respect to the first and second frame members to provide additional structural support. The depth between frame members 30 and 32 with tailgate edge.

Towing accessory 14 also includes a pair of tailgate links 36a and 36b attached to each end of second frame member 32. Tailgate links 36a and 36b are connected to second frame member 32 by fasteners 42a and 42b, respectively (and illustrated as 42 in FIG. 8). Each tailgate link also includes a hole 44a, 44b at each end adapted to receive a bolt on the truck bed 12. Tailgate link is used to secure second frame member 32 onto the frame of the truck 10.

Figure 6:
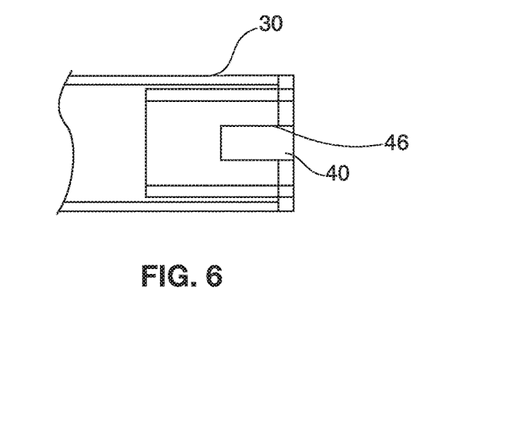
FIG. 6 is a sectional view of the slot of the first frame member shown in FIG. 5.

Turning to FIG. 6, first frame member 30 includes a slot 40 for forming a hinge and securing it to truck bed 12. Slot 40 may further include a rubber lining 46 to create a tight seal between slot 40 and a hinge insert on a tailgate post of truck bed 12. In other examples, a pair of slots may be included on each opposing end of first frame member 30.

Figure 7:
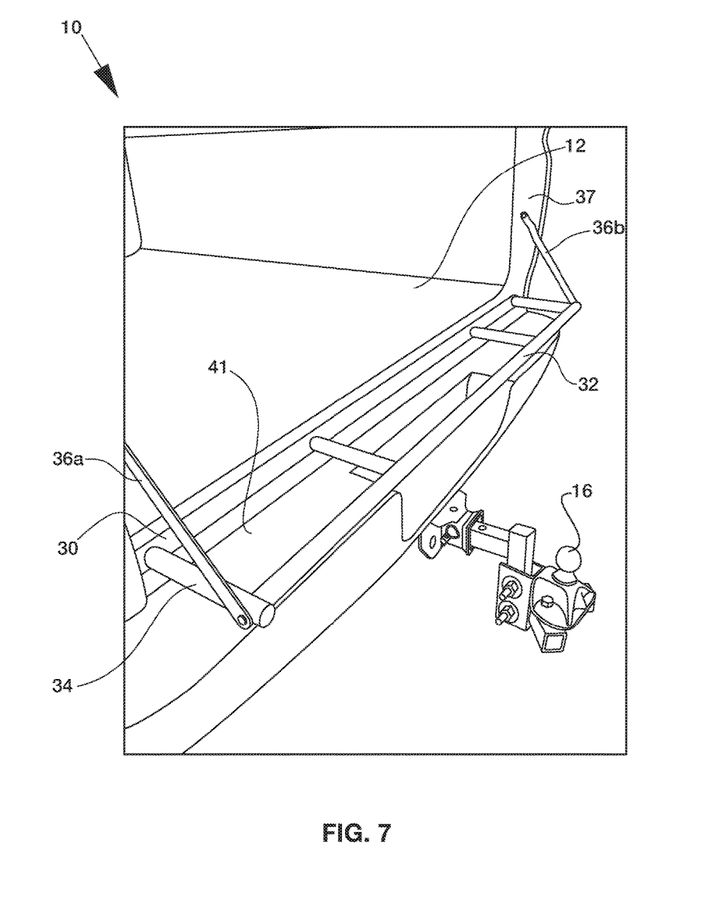
FIG. 7 is an overhead perspective view of the towing accessory.
Figure 8:
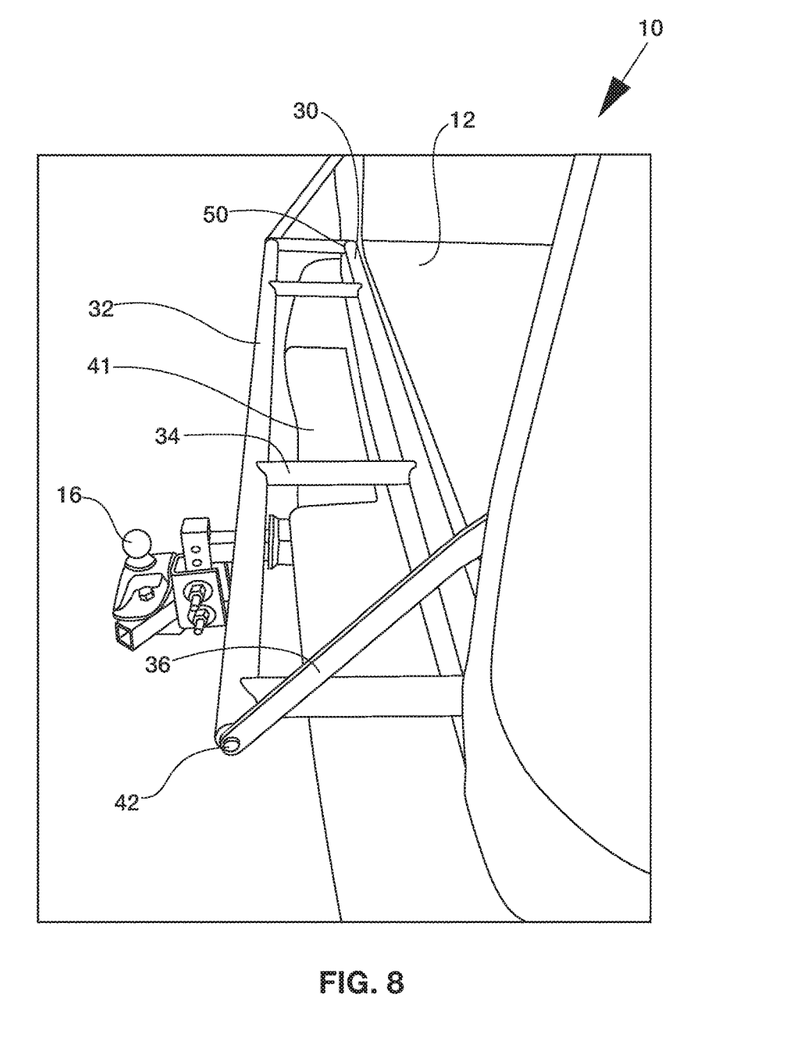
FIG. 8 is a side perspective view of the towing accessory shown in FIG. 7.
Figure 9:
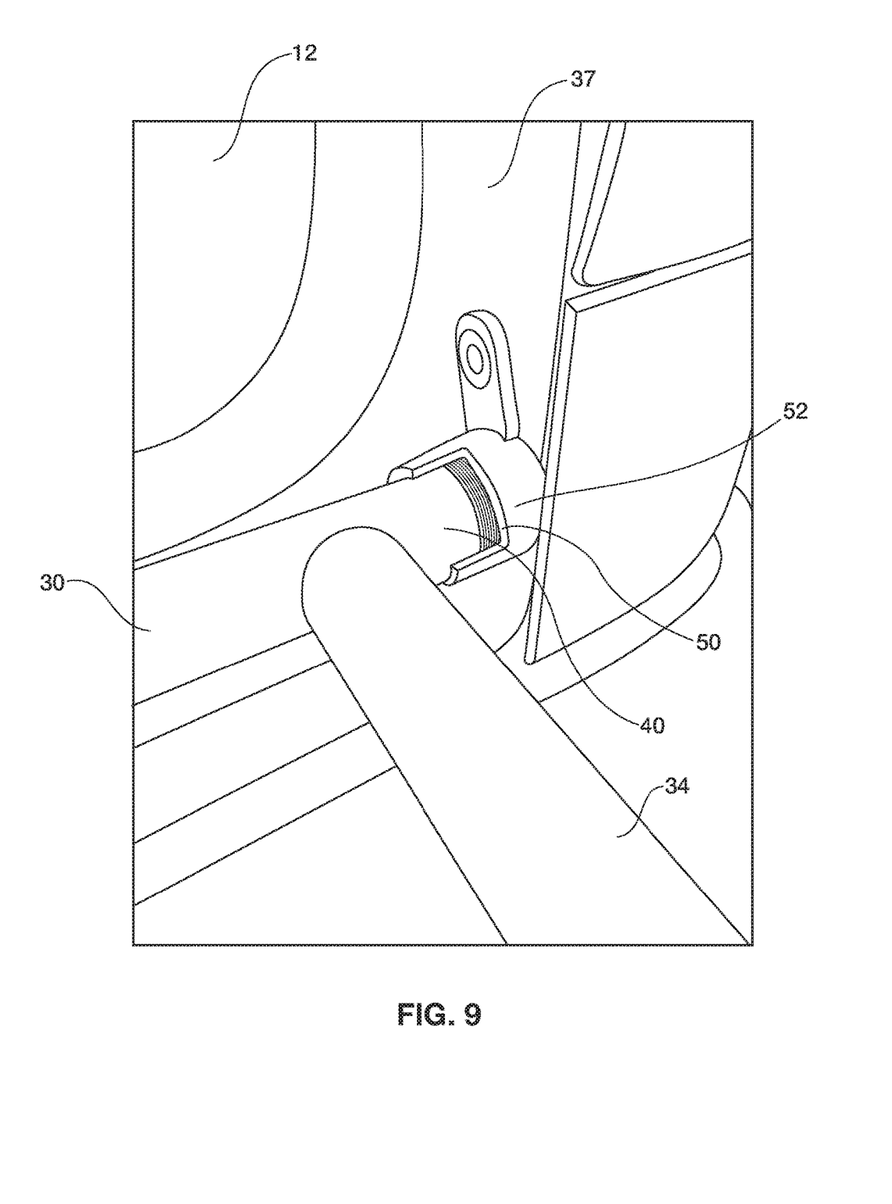
FIG. 9 is an enlarged view of a hinge formed by the truck bed and first frame member.

FIGS. 7 and 8 show a towing accessory 14 installed onto the distal end of truck bed 12 of truck 10. First frame member 30 is directly secured to tailgate post 37 and forming a hinge 50, while second frame member 32 is secured to tailgate post by tailgate links 36a and 36b. FIG. 9 shows a close-up view of the hinge 50 formed by first frame member 30 and the hinge insert 52 on tailgate post 37.

Figure 10:
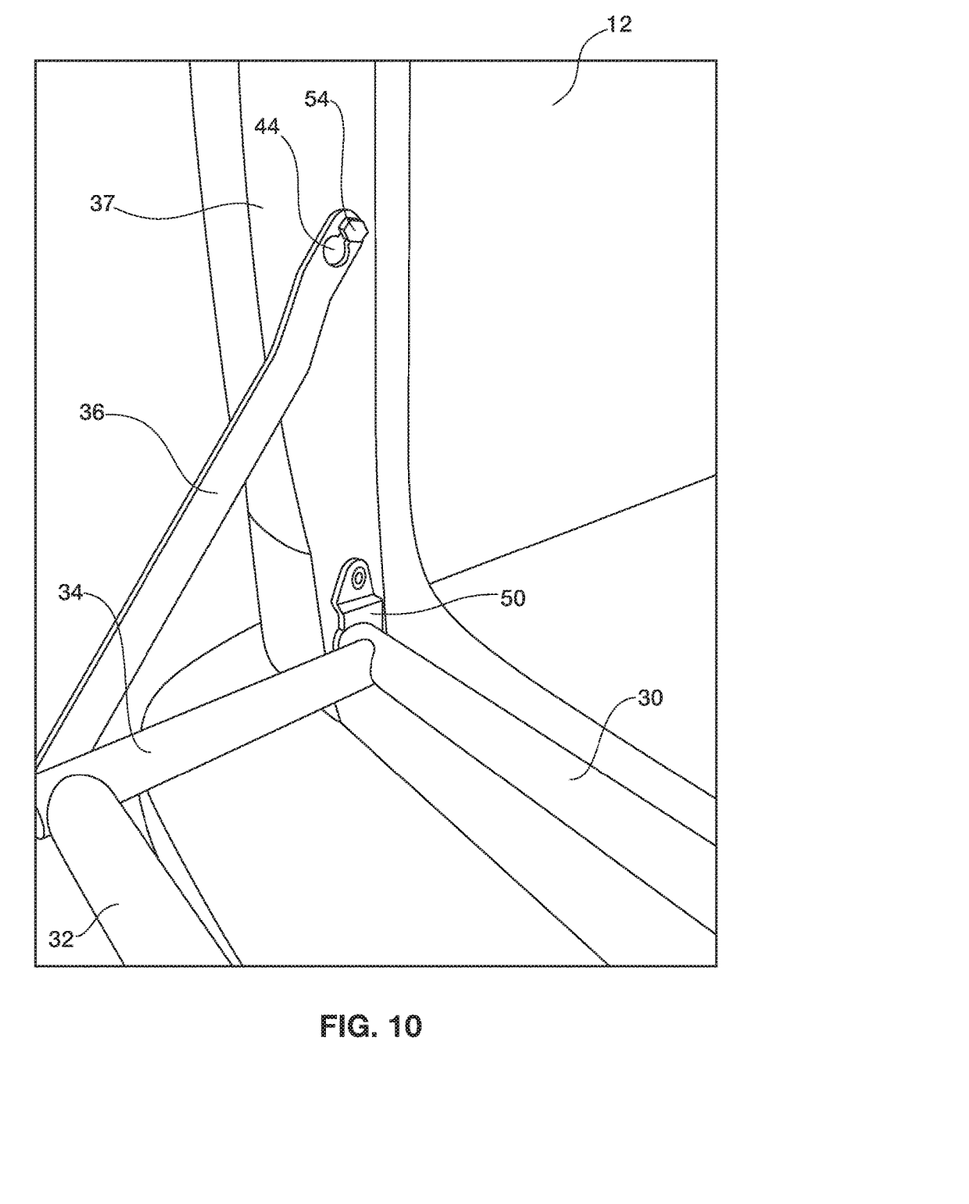
FIG. 10 is an enlarged view of a tailgate link attached to the truck bed and the second frame member.

FIG. 10 shows a close-up view of tailgate link 36 attached to tailgate post 37. Tailgate post 37 includes a striker assembly 54 that is inserted into recess 44 of tailgate link 36.

One unexpected advantage with the towing accessory 14 is the cavities 41 formed between first frame member 30 and second frame member 32 that the pair of wheels 22 rest within while second vehicle 20 is loaded onto the truck bed 12. The thickness of the frame members along with spacing between the frame members enables the pair of wheels 22 to rest securely within cavities 41, instead of rolling out of the towing accessory 14.

Figure 11:
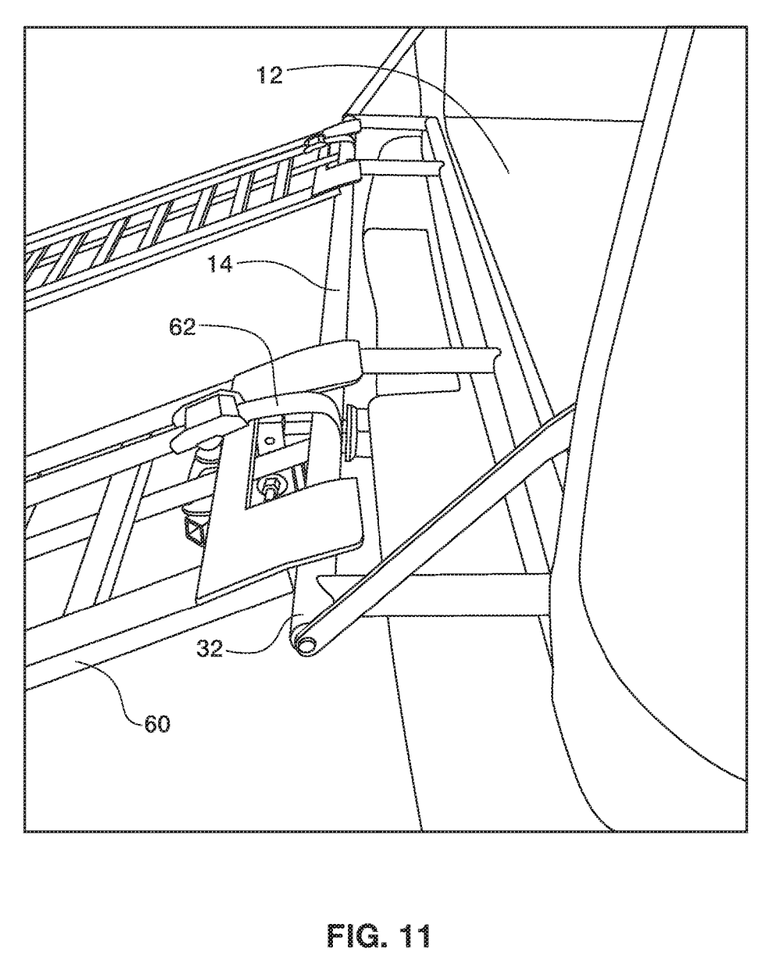
FIG. 11 is an overhead perspective view of the towing accessory including a pair of guides attached to facilitate loading of a second vehicle.

In operation, towing accessory 14 may be used in conjunction with other items to facilitate loading and securing of a second vehicle onto truck bed 12. For example, as seen in FIG. 11, a pair of guides 60 may be attached to towing accessory 14 via belts 62 to load a second vehicle 20 onto the truck bed 12. Similarly, belts may also be used to tie and secure the pair of wheels onto supports 34.

As depicted in the examples, first frame member 30, second frame member 32 and supports 34 are comprised of tubing frames. In other examples, either frame member and/or supports may be comprised of other rigid materials, and may further vary in materials among the individual components. For instance, first and second frame members may comprise a first rigid material, while supports 34 may comprise a second material.

Similarly, tailgate link 36 is shown as a rigid beam in the examples above. In other examples, tailgate link 36 may comprise a cable. Moreover, tailgate link 36 may further include a hinge on the beam so that towing accessory 14 may be positioned between a stowed position for storage and an extended position for securing the second vehicle, similar to a traditional tailgate. The tailgate link 36 may further include a spring on the beam adapted to bias the towing accessory toward the stowed position and prevent the tailgate link 36 from unintendedly extending outward.

FIGS. 12-18 provide another example of a towing accessory in accordance with the present disclosure. As seen in this example, towing accessory 14' comprises a first frame member 30' and a second frame member 32' connected by two pairs of supports 34'. A first pair of supports 34a' and 34b' are adapted to secure a first wheel, while the second pair of supports 34c' and 34d' are adapted to secure a second wheel. Each wheel may be inserted between each pair of supports. For instance, the left wheel may be inserted in between supports 34a' and 34b' and the right wheel may be inserted in between supports 34c' and 34d'. In other examples of towing accessory 14', only a single pair of supports 34' may be provided. For instance, first frame member 30' may be connected to second frame member 32' via support 34b' and 34c'. The pair of wheels 22 of a second vehicle 20 may be either placed directly on or adjacent to each support 34'. Placement of supports 34' may vary depending on the width of the truck bed 12 as well as the spacing between the wheels that towing accessory 14' may be designed to accommodate. For example, towing accessory 14' may include only a single pair of supports 34a' and 34d'. In other examples, additional supports may be included to provide more spacing options for placing a pair of wheels within the towing accessory to secure a second vehicle.

Returning to the example shown in FIGS. 12-18, the first frame member 30' and second frame member 32' are oriented substantially parallel with one another. Moreover, each support 34' is parallel with one another, but remain perpendicular with respect to the first and second frame members to provide additional structural support. The depth between frame members 30' and 32' with tailgate edge.

Figure 12:
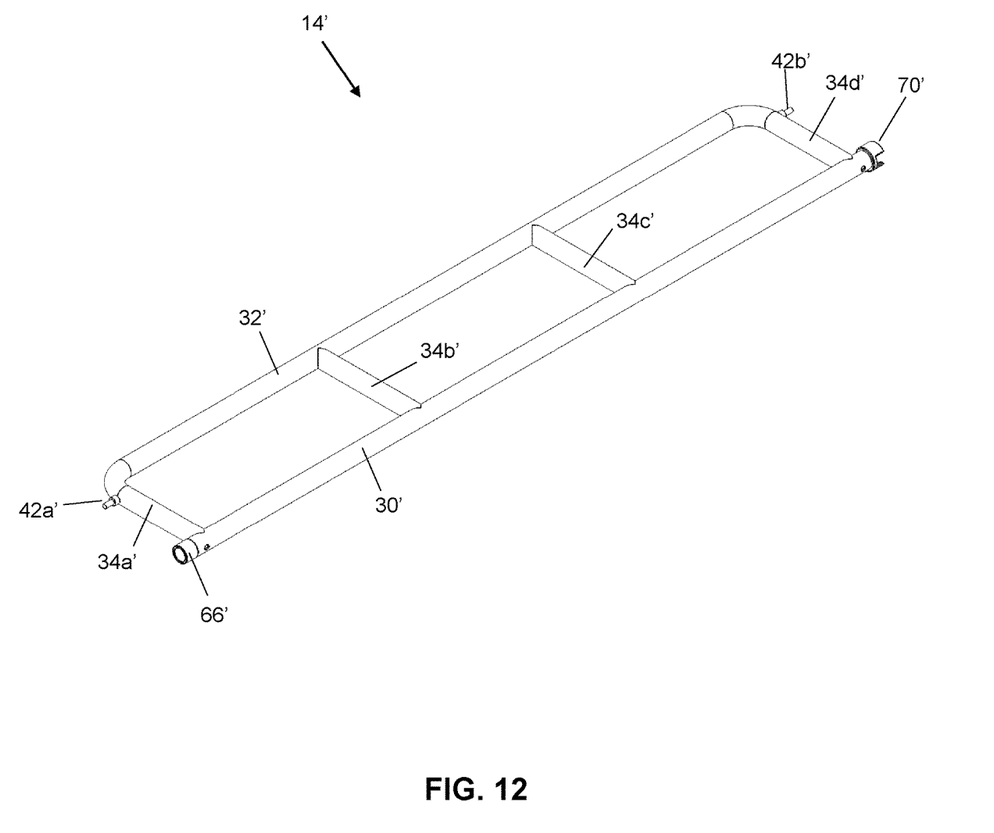
FIG. 12 is an overhead perspective view of the towing accessory constructed according to another example of the present disclosure.
Figure 13:
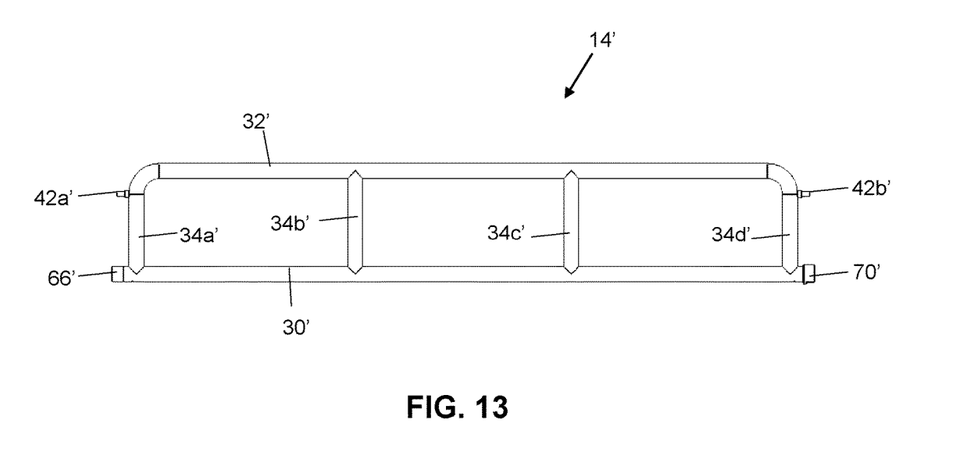
FIG. 13 is a front elevational view of the towing accessory shown in FIG. 12.
Figure 14:
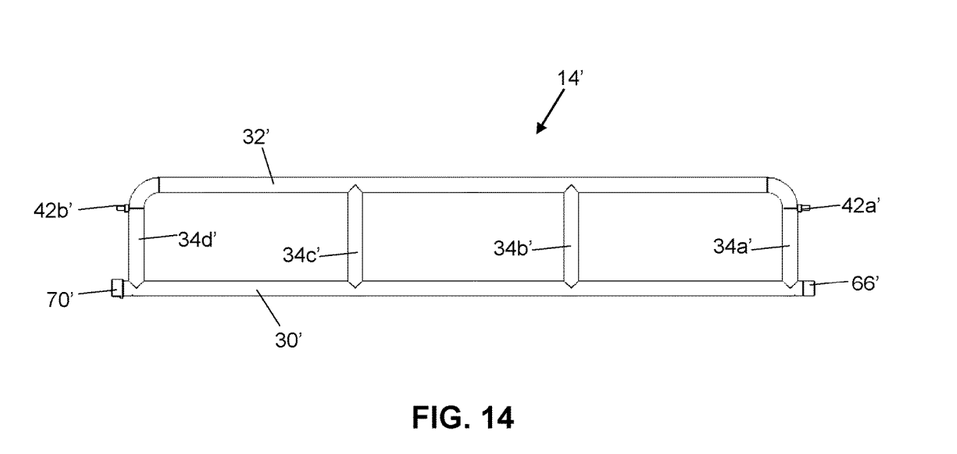
FIG. 14 is a rear elevational view of the towing accessory shown in FIG. 12.

Towing accessory 14' also includes a pair of tailgate links 36a' and 36b' attached to each end of second frame member 32'. Tailgate links 36a' and 36b' are connected to second frame member 32' by fasteners 42a' and 42b', respectively. Each tailgate link also includes a hole 44' at each end adapted to receive a bolt on the truck bed 12. Tailgate link is used to secure second frame member 32' onto the frame of the truck 10'.

Figure 15:
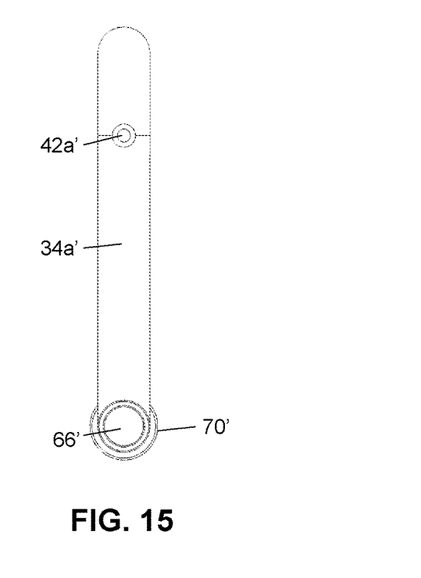
FIG. 15 is a left side elevational view of the towing accessory shown in FIG. 12.
Figure 16:
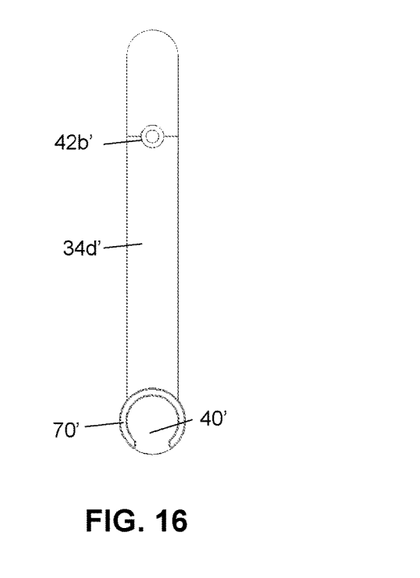
FIG. 16 is a right side elevational view of the towing accessory shown in FIG. 12.
Figure 17:
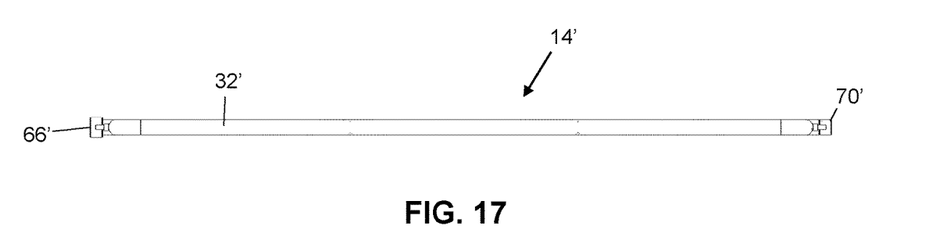
FIG. 17 is a top view of the towing accessory shown in FIG. 12.
Figure 18:
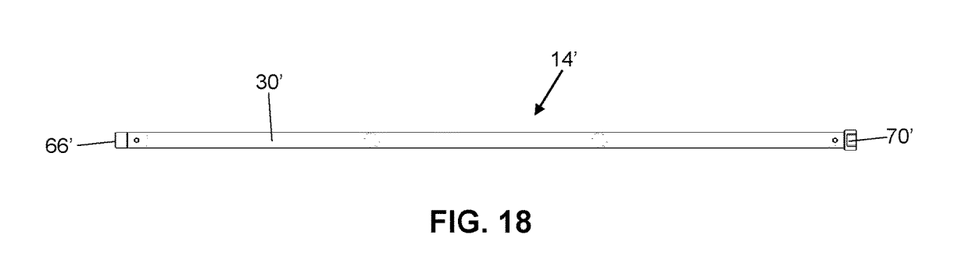
FIG. 18 is a bottom view of the towing accessory shown in FIG. 12.
Figure 19:
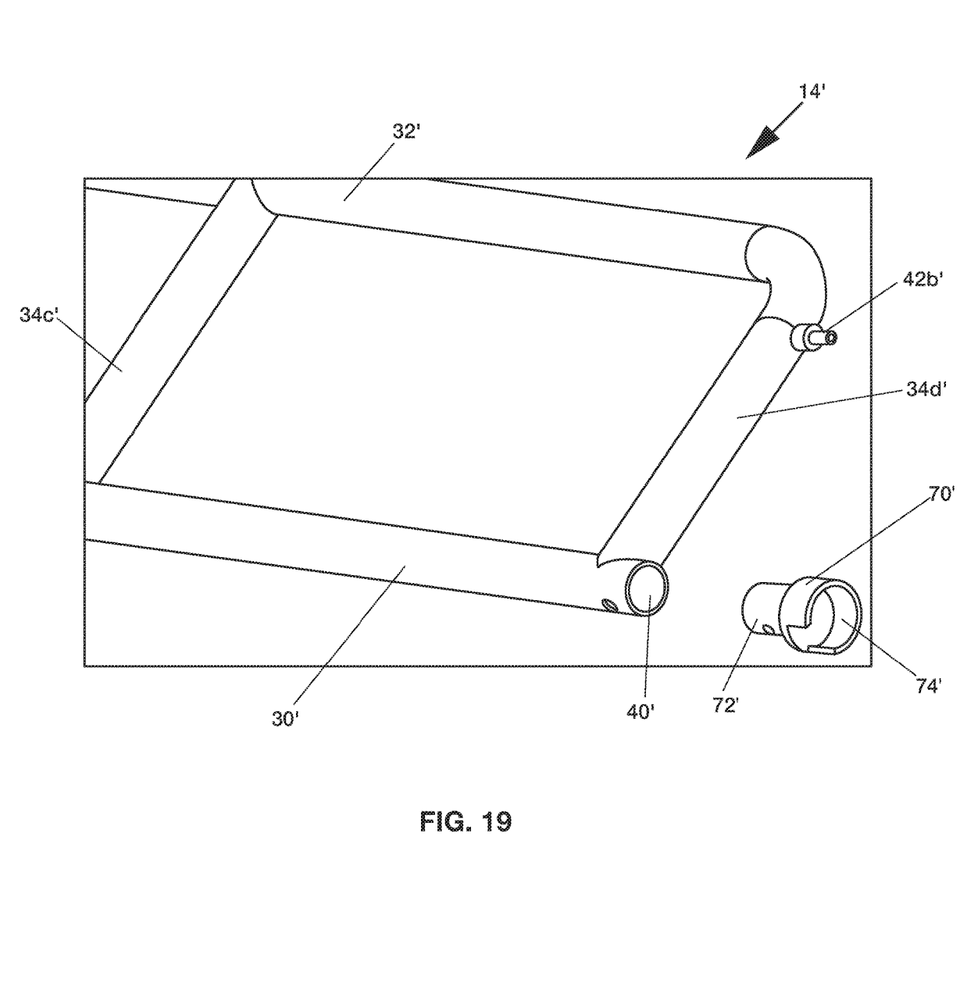
FIG. 19 is an enlarged view of the towing accessory shown in FIG. 12.

The ends of first frame member 30' are capped with a first hinge piece 66' and a second hinge piece 70' that are secured to the truck bed 12 to form hinges 50. Hinge pieces 66' and 70' are also adapted to accommodate the length of the first frame member 30' within truck bed 12. As shown in FIG. 15, the first hinge piece 66' is adapted for a first receiving component of a truck bed 12 to be inserted into it and forming a first hinge. As seen in FIGS. 16 and 19, the second hinge piece 70' is comprised of a first portion 72' adapted to be inserted into slot 40', and a second portion 74' with a cross-sectional cut to be placed over a second receiving component of truck bed 12, thereby facilitating installation of the tailgate accessory 14'.

The present disclosure may also be considered as a method for carrying a second vehicle on a truck. For instance, a user may replace the factory-installed tailgate by removing it from the truck and inserting opposing ends of a first frame member of towing accessory 14 into a pair of tailgate posts on the truck. First frame member 30 may be secured onto the tailgate post by inserting a hinge insert 52 into a slot 40 located on at least one end of first frame member 30. The second frame member 32 is secured by connecting a pair of tailgate links 36 found between the ends of the second frame member to a pair of striker assemblies located on the tailgate posts of the truck. Once the towing accessory is installed, then a user may insert the second vehicle onto the truck bed, and secure it by placing a pair of wheels of the second vehicle onto the first member and second frame member of the tailgate replacement. The pair of wheels are aligned onto a pair of supports that connect the first frame member with the second frame member. By loading the second vehicle onto the truck bed, a recreational vehicle may be towed using the hitch of the truck.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

We claim:

1. A truck having a towing accessory adapted to carry a second vehicle comprising:
   a truck bed having a proximal end and a distal end; and
   a towing accessory attached to the distal end of the truck bed, the towing accessory including a first frame member and a second frame member with lengths spanning a width of the truck bed and spaced substantially parallel to one another, the first frame member and the second frame member connected by a tubular support, wherein the towing accessory is adapted to support a pair of wheels of a second vehicle by extending the length of the truck bed, and wherein the truck bed forms a hinge with each end of the first frame member.

2. The truck of claim 1, wherein the first frame member and second frame member are formed from tubing frames.

3. The truck of claim 1, wherein the hinge is formed between a slot in the first frame member and a tailgate post in the truck bed.

4. The truck of claim 3, wherein the tailgate post is secured by a rubber lining in the slot.

5. The truck of claim 1, wherein the towing accessory has a stowed position adapted for storage and an extended position adapted for supporting the second vehicle.

6. The truck of claim 5, wherein the second frame member is positioned distally away from the first frame member and the truck bed while the towing accessory is in an extended position.

7. The truck of claim 5, wherein the second frame member is positioned above the first frame member when the towing accessory is in a stowed position.

8. The truck of claim 7, wherein the first frame member and second frame member align with substantially no overlap.

9. A towing accessory for a truck adapted to carry a second vehicle in a truck bed comprising:
- a first frame member with opposing ends adapted to form a tailgate hinge;
- a second frame member substantially parallel to the first frame member adapted to extend the length of the truck bed;
- a support attaching the first frame member to the second frame member, the support adapted to secure a pair of wheels of the second vehicle; and
- a tailgate link attached to one end to the second frame member and having another end adapted for attaching to a truck.

10. The towing accessory of claim 9, wherein the first frame member is telescopic to accommodate varying widths of truck beds.

11. The towing accessory of claim 9 further including a pair of supports adapted to retain the pair of wheels of the second vehicle within the towing accessory.

12. The towing accessory of claim 11 further including a second pair of supports.

13. The towing accessory of claim 9, wherein the tailgate link comprises a first tailgate link and a second tailgate link attached to opposing ends of the second frame member.

14. The towing accessory of claim 13, wherein the tailgate link comprises a cable.

15. The towing accessory of claim 13, wherein the tailgate link comprises a beam.

16. The towing accessory of claim 15 further including a hinge on the beam adapted to position the towing accessory between a stowed position for storage and an extended position for securing the second vehicle.

17. The towing accessory of claim 16, further including a spring on the beam adapted to bias the towing accessory toward the stowed position.

18. A method for carrying a golf cart on a truck comprising the steps of:
- removing a tailgate from the truck,
- inserting opposing ends of a first frame member of a tailgate replacement into a pair of tailgate posts on the truck,
- supporting a second frame member of the tailgate replacement by connecting a pair of tailgate links installed at the ends of the second frame member to a pair of striker assemblies located on the truck,
- inserting the golf cart onto the truck bed,
- placing a pair of wheels of the golf cart onto the first member and second frame member of the tailgate replacement, and
- aligning each pair of wheels onto a pair of supports connecting the first frame member with the second frame member.

19. The method of claim 18, further including the step of securing a recreational vehicle to a hitch of the truck.

* * * * *